United States Patent
Koga

(10) Patent No.: US 7,075,670 B1
(45) Date of Patent: Jul. 11, 2006

(54) SERVER APPARATUS FOR MANAGING PRINT ATTRIBUTE INFORMATION AND PRINT CONTROLLING

(75) Inventor: Hiroshi Koga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/498,628

(22) Filed: Feb. 7, 2000

(30) Foreign Application Priority Data

Feb. 8, 1999 (JP) ............................................ 11-030647
Jan. 18, 2000 (JP) ....................................... 2000-008958

(51) Int. Cl.
  *G06F 15/00* (2006.01)
  *G06F 15/16* (2006.01)
  *G06F 3/00* (2006.01)

(52) U.S. Cl. ..................... 358/1.15; 358/1.16; 709/224; 709/247; 725/41

(58) Field of Classification Search ................ 358/1.15, 358/1.18, 1.16, 2.1, 220–224; 715/501.1, 715/500; 725/41; 709/247, 234, 224, 220, 709/1.15

See application file for complete search history.

(56) References Cited

U.S. PATENT DOCUMENTS 5,333,246 A      7/1994    Nagasaka .................... 395/133
6,166,826 A   *   12/2000    Yokoyama ................. 358/1.16

FOREIGN PATENT DOCUMENTS

EP      0 738 949 A1     10/1996
EP      0 772 114 A1     5/1997

* cited by examiner

*Primary Examiner*—Mark Wollerson
*Assistant Examiner*—Saeid Ebrahimi Dehkordy
(74) *Attorney, Agent, or Firm*—Fitzpatrick, Cella, Harper & Scinto

(57) ABSTRACT

An object of the present invention is to readily and efficiently execute print control when outputting from a remote client to a desired printer via the internet or when printing by using an attribute setting matched with an output mode of a given document. Therefore, in case of performing printing by a desired printer out of a plurality of printers on the internet, an attribute setting file corresponding to a document to be printed is previously stored in a print server on the internet, and this attribute setting file is used with respect to the same or similar document to carry out the document printing.

34 Claims, 9 Drawing Sheets

SERVER APPARATUS FOR MANAGING PRINT ATTRIBUTE INFORMATION AND PRINT CONTROLLING

BACKGROUND OF THE INVENTION

1. Field of the Invention

The present invention relates to a web server for causing a designated printer to perform print processing of print information from a plurality of clients through the internet, a controlling method thereof, and a program storage medium.

2. Related Background Art

On a system including a server/clients and a printing device (printer) connected through a conventional network, e.g., a LAN, when printing a document based on a document print command from each client, the following processing is executed.

(I) Under a network environment such as a TCP/IP according to a LAN (Local Area Network), when a system constituted by the server/clients and a printing device (printer) is used to output a document to the printer on the network based on a document print command from a client, a large-scale system operation provided with various functions such as access management, management of various hardware and software resources, management of various data and others is executed.

(II) In a system on a network constituted by the server/clients and a printing device (printer), a printer suitable for an object of document printing is selected by a user using a client computer; document print attribute setting data (a paper size, a direction of paper, a resolution, a print layout, a form overlay specification and others) appropriate for this printer is created; and print data based on the document is transmitted to the printer or a print server for managing this printer. Thereafter, when again printing the same or similar document, document print attribute setting data appropriate for the target printer must be again created by the client computer. Further, when printing the same or similar document from a plurality of clients, the document to be printed must be prepared in each client and the document print attribute data must be set for each client.

In the prior art, however, when outputting the data from a remote client to a specific printer through the internet by a communication network and when printing by using an attribute setting matched with an output mode of the document, the following problems occur.

At first, in the prior art described in (I), the print processing to a remote site through the internet is not taken into consideration. Therefore, when realizing the print processing to the remote site through the internet, a large-scale system provided with various functions such as access management, management of various kinds of hardware and software resources such as a document editing application, a printer driver and others, management of various data and others must be operated with the similar scheme at respective physically remote places, and hence a cost for using lines in communication, a cost for maintaining facilities, a cost for operation/management and others are vast.

At second, since the prior art described in (II) takes reuse of the same or similar document for printing into consideration, the client must regenerate the document print attribute setting data when printing the same or similar document. Additionally, the prior art does not take into account that the same or similar document is printed from a plurality of clients. Therefore, when printing the same or similar document from a plurality of clients, the document to be printed and an application which can make reference to this document must be prepared by each client, and the document print attribute setting data must be set in accordance with each client. Thus, the document printing job in this network environment is very inefficient, and when the print attribute setting data must be updated, the setting in all the clients must be manually carried out, which leads to an increase in cost.

SUMMARY OF THE INVENTION

In view of the above-described drawbacks, it is a first object of the present invention to provide a print server and a print processing method which can print the same or similar document from a plurality of clients under the internet environment based on attribute setting information managed by a web server when outputting the document to a desired printer which is not managed by the same server as that of the clients.

Further, it is a second object of the present invention to provide a print processing method which enables print output even if a client does not have a printer driver for controlling a printer when giving a print instruction to the corresponding printer through the internet.

Furthermore, it is a third object of he present invention to provide a print processing method for enabling a plurality of users to share a print output of a print target file created by an arbitrary client without each client having an application used for creating the print target file.

To this end, the present invention provides a web server which receives print information from a plurality of clients through the internet and causes a designated printer to print the print information, comprising: managing means for managing print attribute information when performing print processing by a plurality of printers under control; communicating means for receiving the print information from the clients through the internet; and controlling means which uses the print attribute information managed by the managing means to control a printer to which the print information is outputted to execute the print processing when the print information is received from an external client through the internet.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

[First Embodiment]

In each embodiment described in detail hereunder, when printing a document generated on a client side by a target printer through the internet, the attribute setting relating to the printer and the document is carried out on the browser, and the attribute setting information is translated into a file in accordance with each document and each printer type to be transmitted to a specified print server or a print driver in order to print the same or similar document by the same or similar printer.

Each of the embodiments according to the present invention will now be described in detail hereunder with reference to the accompanying drawings.

In a communication system including a print server connected to an internet web server through a public line or a dedicated line based on HTTP (Hyper Text Transfer Protocol) and a printing device (printer) connected (shared) to this print server, an attribute setting screen (user interface) generated by HTML (Hyper Text Markup Language) is used to carry out various kinds of attribute setting.

Various attribute settings are translated into a file to create an attribute setting file on a host computer which serves as a client, and the attribute setting file is transmitted to a print server where the file is managed/stored. In response to a command for printing a document or a command requesting acquisition of various attribute setting files issued from another client, a print attribute setting file is distributed to the corresponding print driver.

A printer control program (printer driver) associated with the printing device outputs a target document from a specified printer based on various attribute setting information for executing printing and external input data such as a figure/character and image drawing command from a client.

Figure 1:
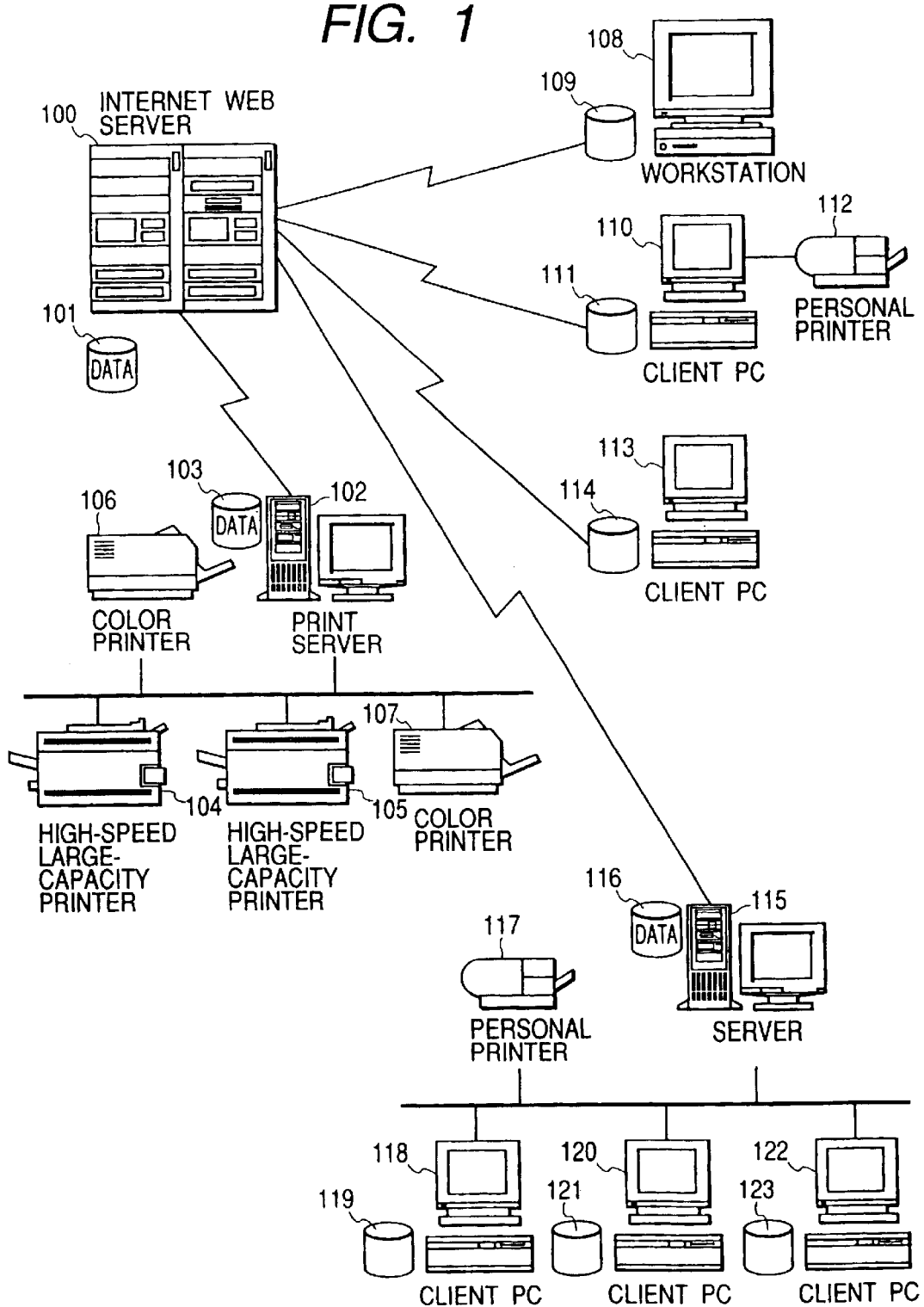
FIG. 1 is a basic block diagram showing a print communication system to which the present invention is applied.

FIG. 1 is a basic block diagram common to the embodiment 1 and other embodiments according to the present invention. In the communication system in which the internet web server 100, the print server 102 and a workstation/personal computers 108 to 122 are connected through a public line or a dedicated line, the internet communication network is constructed based on HTTP (Hyper Text Transfer Protocol) with the internet web server 100 as a core.

According to the communication system shown in FIG. 1, for example, the workstation 108 which can be a client or the personal computers 110, 113, 118, 120 and 122 can issue a command for printing a document managed/stored on the print server 102 or a document generated by each client to various printers 104 to 107 connected to/managed (shared) by the print server 102 in order to execute the print output by each printer. The printer executing output of the document can be selected/specified from high-speed, high-capacity printers 104 and 105 or color printers 106 and 107 under control of the print server 102 connected through the internet. Further, a personal printer 117 under control of the server 115 provided in a remote place or a personal printer 112 connected to the client/personal computer 110 which is also provided in a remote place can be also selected/specified.

On the client side, when instructing printing of the document, the attribute setting based on the document and the attribute setting based on a function of that printer type are set on the attribute setting screen (user interface) on the internet browser with respect to the selected/specified printer, and they are translated into a file (creation of this attribute setting file will be described later with reference to FIG. 2).

The above-described attribute setting file is transmitted to the internet web server 100 or the print server 102 (or the server 115 or the client PC 110) to be managed/stored therein. Thereafter, based on a command for printing the similar document or a command requesting acquirement of the attribute setting file from another client, the print information is supplied to the corresponding printer. That is, the attribute setting file is read by the printer control program (printer driver), and a target document is printed from a target printer based on this attribute setting.

Figure 2:
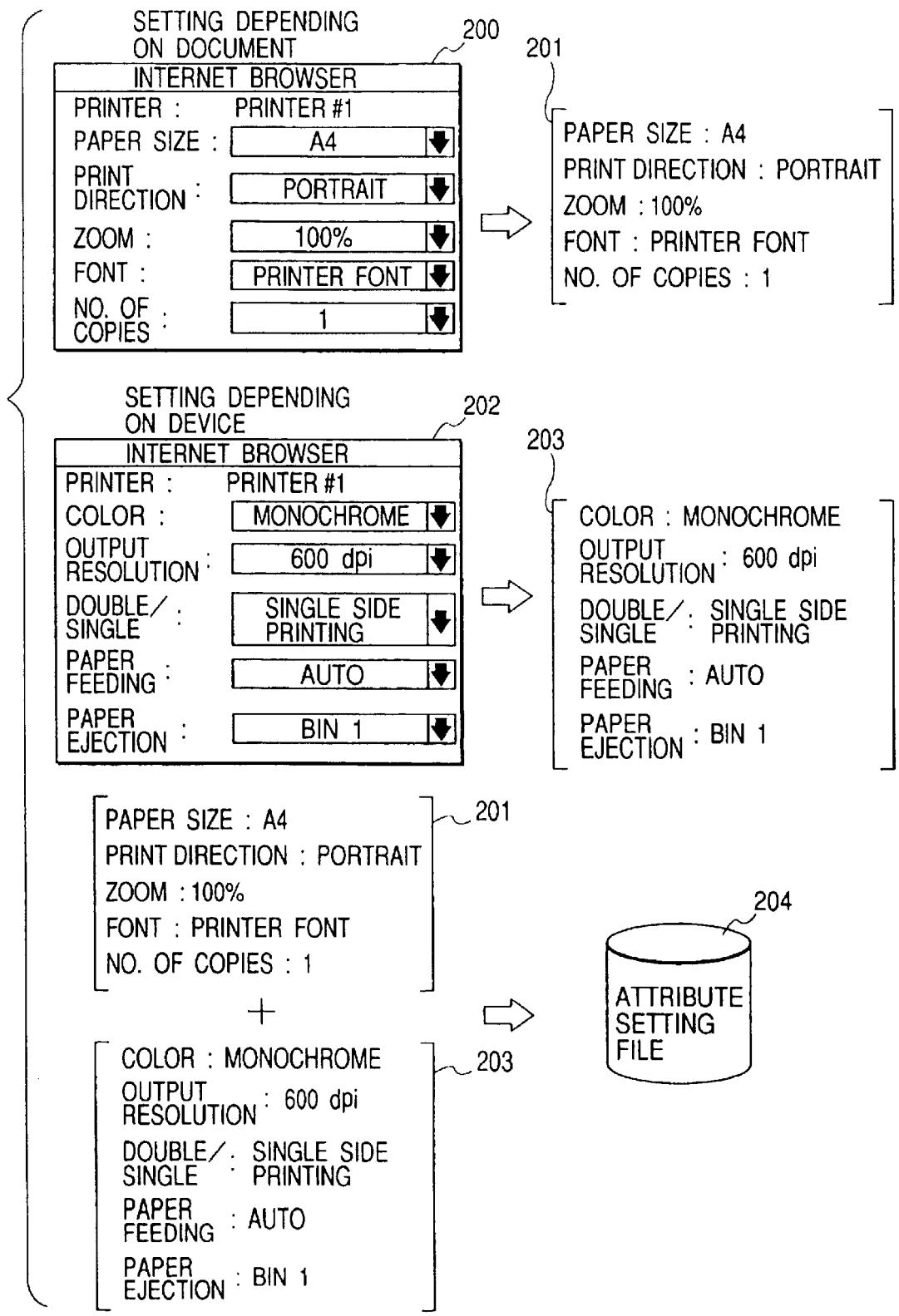
FIG. 2 is a view showing a structural example of attribute setting screens (user interface) and an attribute setting file on a host system (client) used in an embodiment according to the present invention.

FIG. 2 is a view explaining the procedure for creating the attribute setting file generated on the client side.

Attributes such as an output paper size, a printing direction, a zoom, a font, a number of copies are set as various attributes dependent on the document to be printed by an attribute setting screen (user interface) developed on the internet browser.

Similarly, as various attribute settings dependent on the selected/specified printing device (printer) for outputting the target document, attributes inherent to this device such as a function specification of the printer, an optional equipment in the main are set by another setting screen (user interface) 202 developed on the internet browser. That is, attribute items such as a color specification (color/monochrome), an output resolution, double/single side printing, paper feeding, paper ejection and the like are specified.

The thus obtained attribute setting data 201 dependent on the document and the attribute setting data 203 dependent on the device are translated into a file together (creation of the attribute setting file 204).

Figure 8:
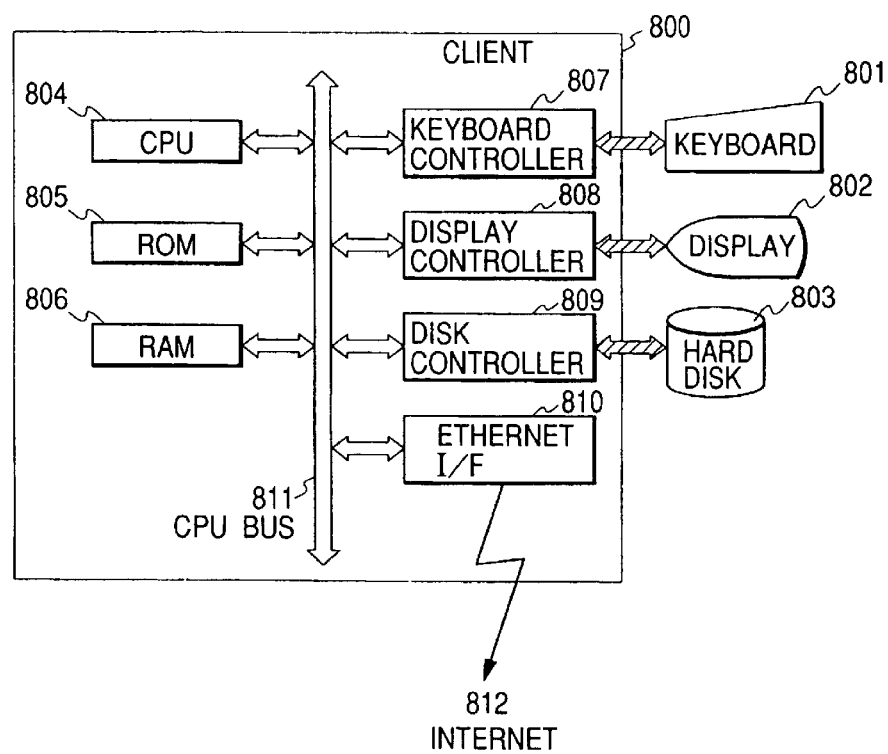
FIG. 8 is a block diagram of a client of the embodiment according to the present invention.

FIG. 8 is a block diagram of a client 800 (110, 113, 118, 120 and 122 illustrated in FIG. 1) in this embodiment.

To the client 800 are connected an input device 801 such as a keyboard or a mouse, a display device (display) 802 for performing display output, and a hard disk device 803 for storing therein the attribute setting file and the like. In this system, the information inputted by the client 800 is transmitted to the internet web server 100 in which the attribute setting file is generated or from which the attribute setting file is downloaded to be used for printing.

The structure of the client 800 will now be described.

Reference numeral 804 denotes a CPU for executing control of each input/output device connected thereto and a series of processing such as a print request and various programs (including the procedure for the processing shown in FIGS. 4 and 5 and partially shown in FIG. 6) in response to an inputted command. Reference numeral 805 designates a memory (ROM) for storing therein various programs such as an operating system for operating the CPU 804. Reference numeral 806 represents a RAM used as a work memory of the CPU 804. Further, information relating to an output of a document or an application program for inputting a command or instructing print are also stored in this RAM.

Reference numeral 807 denotes a keyboard controller provided with the interface of the input device 801 such as a keyboard/mouse connected to the client 800. Reference numeral 808 designates a display controller provided with the interface for performing the display output to the display 802. Reference numeral 809 represents a disk controller provided with the interface to the hard disk device 803. Reference numeral 810 denotes an interface for establishing connection with the internet for performing communication between the client 800 and an external system. Reference numeral 811 designates a CPU bus for connecting the above-described constituent elements. Reference numeral 812 represents an internet line.

The processing by the client 800 will now be described.

In the first place, the client creates the attribute setting file 204 shown in FIG. 2 as will be described later and transmits it from the browser of the client to the internet web server 100.

The attribute setting file is then stored in the Internet web server 100 or the print server transmitted from the internet web server 100. The internet web server 100 uses a table to manage a position at which the attribute setting file stored therein and in each print server is held.

The client then request an attribute setting file list to the internet web server 100 in order to instruct printing of the document to the internet web server 100 and causes the obtained list to be displayed by using the browser so that a user is urged to select and input an attribute setting file to be used. The client 800 directs the internet web server 100 that the designated attribute setting file is used for printing the document and causes the internet web server 100 or the print server to execute print processing.

Figure 3:
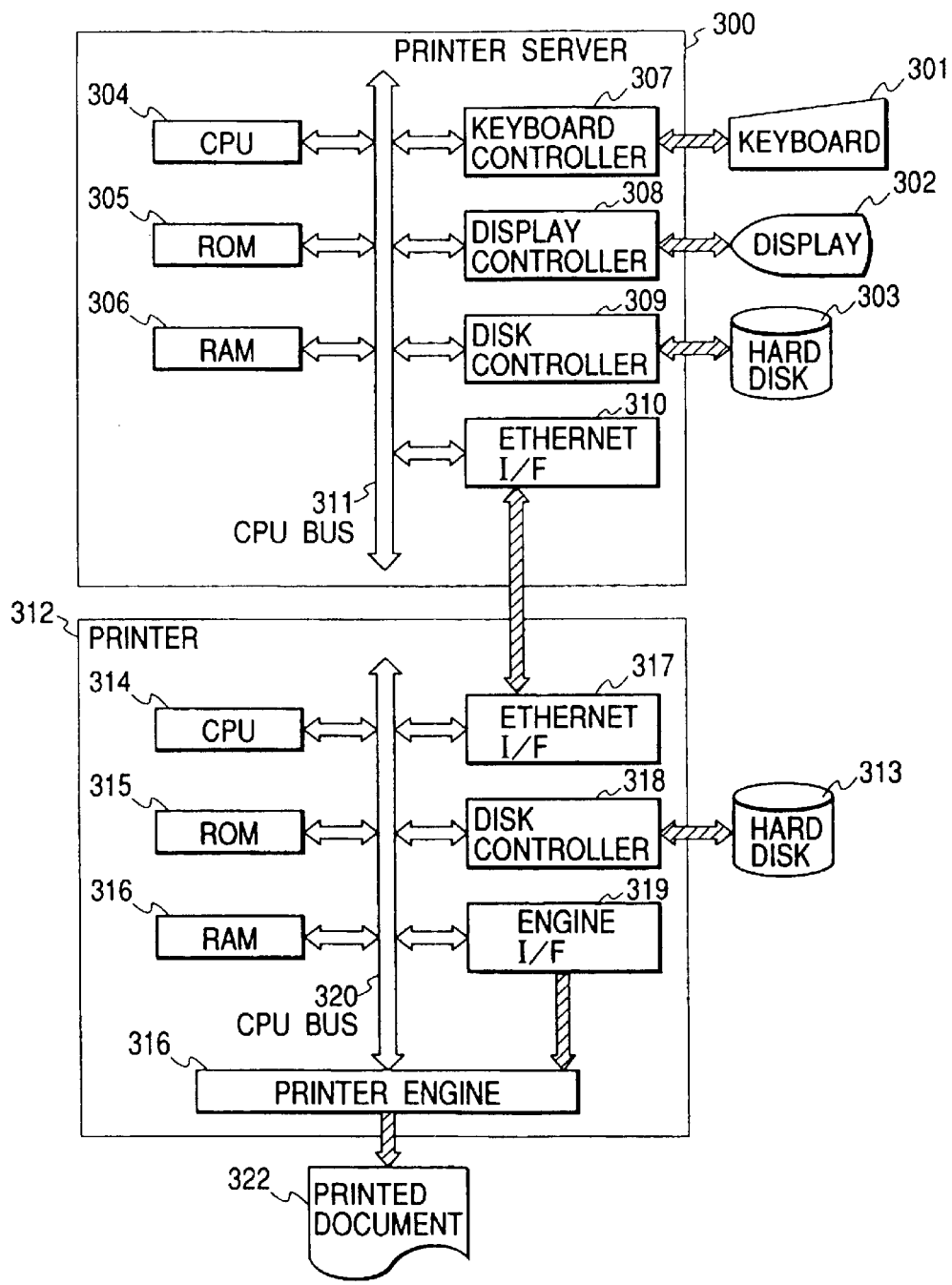
FIG. 3 is block diagram of a print server and a printer connected thereto according to the embodiment of to the present invention.

FIG. 3 is a block diagram showing a server 300 (the internet web server 100, the print server 102 and the server 115 shown in FIG. 1) and a printer 312 connected to this server in this embodiment. Here, since the respective servers have the similar structure, the block diagram relating to the representative print server will be explained.

To the print server 300 are connected an input/output device 301 such as a keyboard or a mouse, a display device (display) 302 for performing the display output, a hard disk device 303 for storing therein the attribute setting file and others. In this system, the attribute setting file is read from the program memory (RAM) 306 in the print server 300 or the hard disk device 300 and a document is outputted from the printer 312 based on the printer control program (printer driver) for executing the print control.

The structure of the print server 300 will now be explained.

Reference numeral 304 denotes a CPU for executing control of each input/output device connected thereto or a series of processing such as output control and various programs (FIG. 6: the internet web server in the main, FIG. 7: the print server in the main) in accordance with an inputted command. Reference numeral 305 designates a memory (ROM) for storing therein various programs such as an operating system for operating the CPU 304. Reference numeral 306 represents a memory (RAM) used as an area for storing a created attribute setting file or a work area for executing the printer driver. Further, information relating to the output of a document, an application program for inputting a command or directing printing and others are also stored in this RAM.

Reference numeral 307 denotes a keyboard controller provided with the interface of the input device 301 such as a keyboard or a mouse connected to the print server 300. Reference numeral 308 designates a display controller provided with the interface for carrying out the display output to the display 302. Reference numeral 309 represents a disk controller provided with the interface to the hard disk device 303. Reference numeral 310 denotes an interface for effecting input/output through a network line, such as Ethernet having a communication protocol for performing communication by connecting the print server 300 to the printer 312. Reference numeral 311 denotes a CPU bus for connecting the above-described respective constituent elements.

The structure of the printer 312 shown in FIG. 3 will now be described in detail. Reference numeral 314 designates a CPU for executing control of various devices connected to the printer 312 or a series of processing such as print control and a program such as communication control processing in accordance with an inputted command. Reference numeral 315 designates a memory (ROM) storing therein programs for operating the printer such as control processing for each device, communication control processing, a series of processing such as printing control in accordance with an inputted command, control command analysis processing, or various data. Reference numeral 316 represents a memory (RAM) used as a work area for the CPU 314. Reference numeral 317 denotes an interface for performing input/output through a network line, such as Ethernet having a communication protocol for transmitting/receiving data by connecting the print server 300 to the printer 312. Reference numeral 318 denotes a disk controller provided with the interface of the hard disk device 313 having various data and the like stored therein. Reference numeral 319 designates an engine control processing section (engine I/F) provided with the interface for transmitting/receiving data and a control signal to/from a print output device driving system (engine section) 321 for executing the pattern output. Reference numeral 320 represents a CPU bus for connecting the above-described respective constituent elements.

The processing executed by the print server 300 will now be described.

The attribute setting file 204 (see FIG. 2) created on the client side is stored in the RAM 306 or the hard disk device 303. A control command for initializing the printer is transmitted based on this attribute setting file.

Based on the respective setting parameters for indicating pattern data of figures/characters and images, a size, data for executing the processing for inputting a drawing output start position and the like, various setting information input processing, input data and information analysis processing for analyzing the read attribute setting information, a size and a drawing output mode for causing the printer to execute printing, the drawing output mode control processing for determining the drawing output mode for the document is carried out. Further, in order to print the document, the output control command conversion processing for converting/generating a printer control command for the printer 312 and the output control command transmission control processing for transmitting the generated print output control command to the printer are performed so that the document is printed by the printer 312.

Description will now be given as to the operation for outputting the document by the print output control processing in accordance with the control program stored in the ROM 315 in the printing device (printer) 312.

A control command for initializing the printer, which is transmitted by the printer driver (program stored in the RAM 306 in the print server 300) is received to execute the initialization processing.

A bit map is then created based on the print control command input processing for inputting the printer print control command transmitted from the print server 300 to enables the printer 312 to effect printing, the control setting parameter analysis processing for analyzing the inputted printer print control command, the various setting parameters and others, and the print control command, and the control setting parameters; a series of processing is carried out by the bit map development processing for developing the bit map to a bit map memory; and the bit map data generated in the print output device driving system (engine section) 312 through the engine control processing section (engine I/F) 319 is transmitted to output the document 322.

With reference to the flowcharts depicted in FIGS. 4 to 7, the detailed description will now be given as to the attribute setting file transmission control from the client PC to the internet web server 100, the download control of "the document-device attribute setting" file from the internet web server 100 to the client, and the printer control procedure from the internet web server to the print server.

Figure 4:
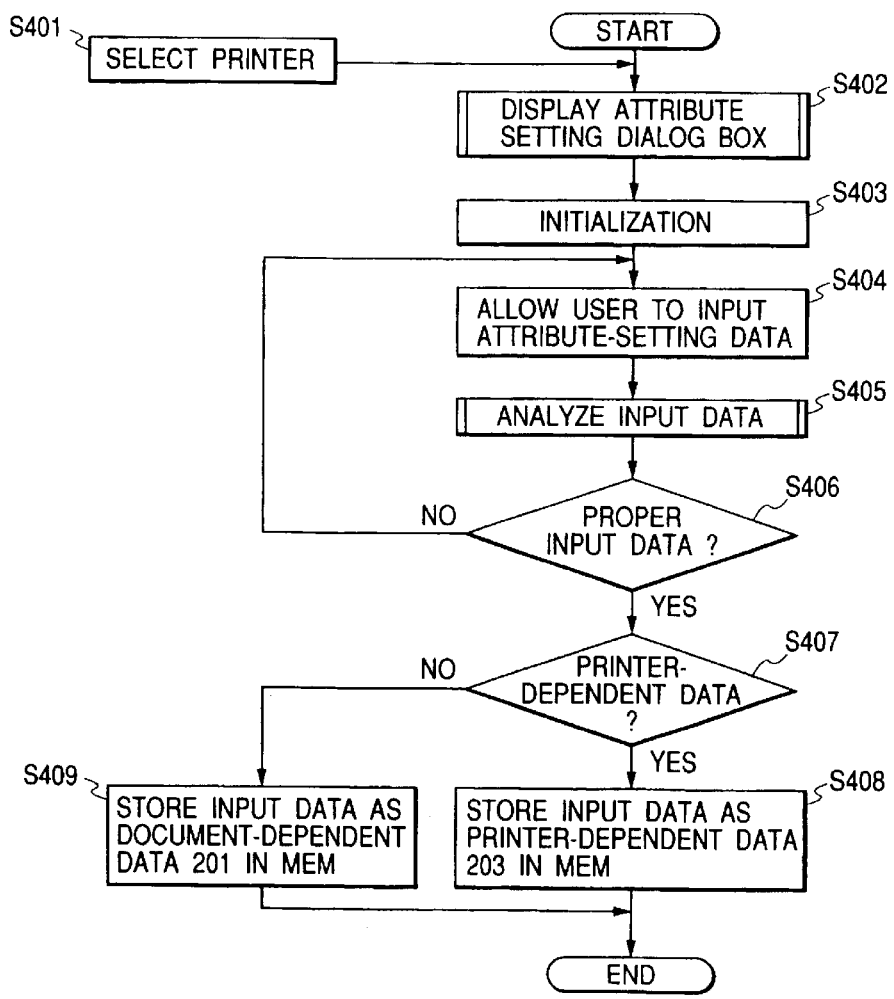
FIG. 4 is a flowchart showing an example of the attribute setting processing executed on a client side.

FIG. 4 is a flowchart showing the control procedure for creating the attribute setting data by the attribute setting screen (user interface) on the internet browser in the respective host systems 108, 110, 113, 118, 120 and 122 each of which functions as a client.

In the step S401, the client inputs selection/designation of a printer connected to the internet on the browser in order to output a target document to a desired printer.

In the step S402, the client displays the setting screens (user interface) 200 and 202 developed on the internet browser shown in FIG. 2 based on the setting items of the printer selected and designated in the step S401.

In the step S403, based on the display setting screens 200 and 202, the initialization processing for effecting various attribute settings matched with the target printer. In the setting screens displayed in the steps S402 and S403, options in the setting screen shown in FIG. 2 are increased/decreased in accordance with the setting items for the selected and designated printer. Description in this screen is made by using HTML, and this screen is used to create a tag for displaying the pulldown menu and increase the items as <option value="XXXXX">. Further, if a number of options is two, <input type="radio"> is generated as a radio button. It is assumed that the items and the options which can be set in each printer are previously held in the client.

In the step S404, the user selectively inputs data for the various attribute settings in the setting screens 200 and 202. When the options of all the setting items are selected and a non-illustrated "execution" button is clicked by the mouse in this state, the processing advances to the step S405. If a "reset" button is clicked before clicking the "execution" button, the processing returns to the step S403 and the options of all the setting items are reset and the default values are displayed.

In the step S405, the analysis processing is executed in order to analyze the inputted various attribute setting data.

In the step S406, there is performed the processing for judging whether the input data is valid based on a result of analysis of the inputted various attribute setting data. If it is determined that the invalid data is inputted as a result of this, re-input is prompted, and the processing returns to the step S404.

The step S407 corresponds to the processing for judging whether the attribute setting data determined to be valid is printer(device)-dependent data and, if it is determined that it is the printer(device)-dependent data, it is stored/held as the printer(device)-dependent data 203 (see FIG. 2) in a memory section such as the RAM or the disk device (step S408). On the other hand, if it is determined that the data is the document-dependent data, it is stored/held as the document-dependent data 201 (see FIG. 2) in the memory section such as the RAM or the disk device (step S409).

Figure 5:
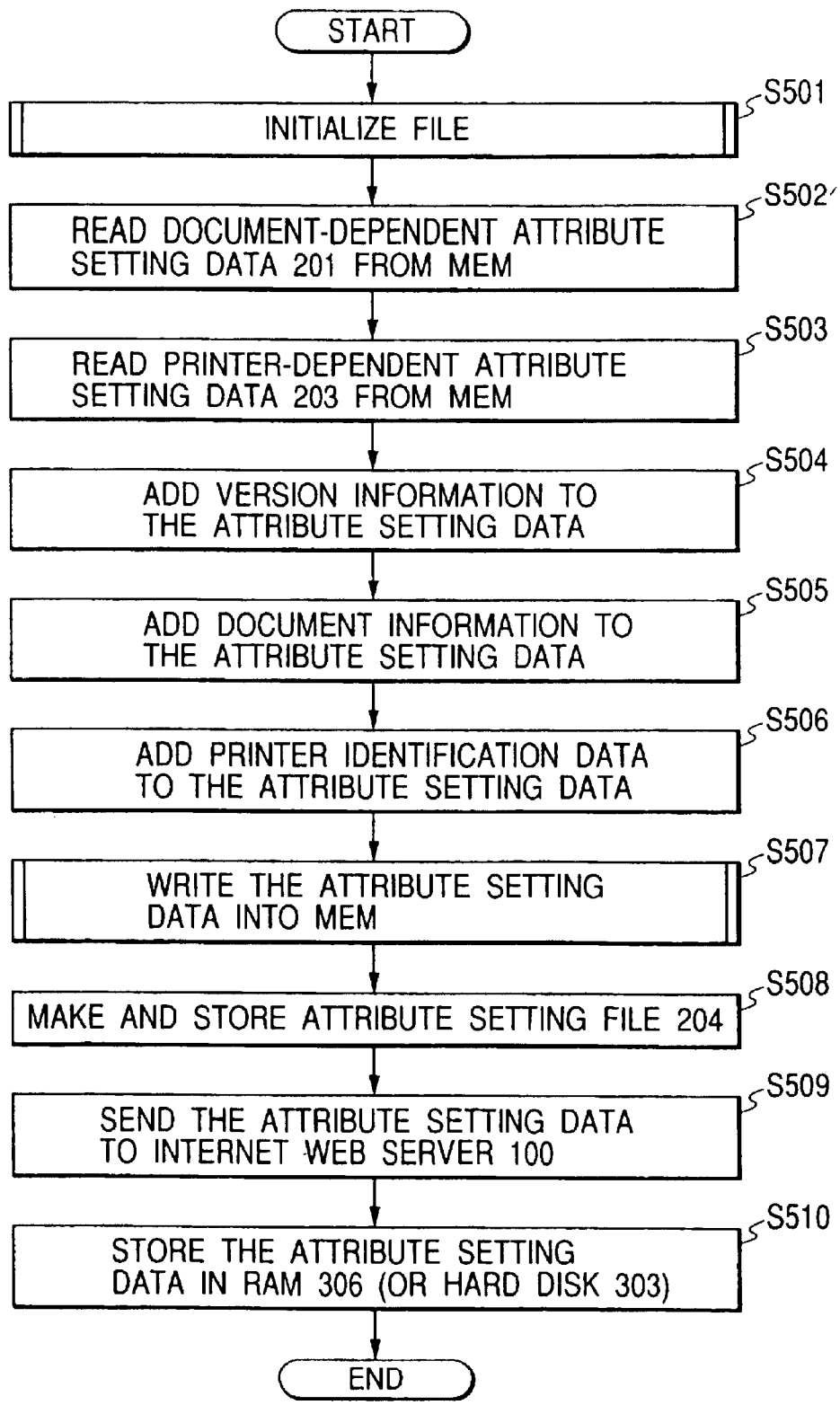
FIG. 5 is a flowchart showing a procedure for processing an attribute setting file transmitted from a client to a print server.

FIG. 5 is a flowchart showing the control processing for creating files of the attribute setting data 201 and 203 (see FIG. 2) to be transmitted from the client to the print server 300 (see FIG. 3) according to this embodiment.

In the step S501, the client executes the initialization processing for creating the attribute setting file. Opening for creation of the file, setting of the file name and the file attribute setting correspond to this processing.

In the steps S502 and S503, the CPU of the client reads the attribute setting data 201 dependent on the document and the attribute setting data 203 dependent on the printer (device) stored/held in the memory section in the step S409 and the step S408.

In the step S504, the client adds the version information for guaranteeing the operation of the present system of the same or above version to each attribute setting data.

In the step S505, the client adds the document information for identifying the document having the valid attribute setting data to the attribute setting data.

In the step S506, the client adds to the attribute setting data the printer type identification data adapted to the attribute setting data.

In the step S507, the clients writes the attribute setting data created in the above-described manner in the memory and creates/stores the attribute setting file 204 (see FIG. 2) (the step S508).

In the next step S509, the client transmits the thus created attribute setting data to the internet web server 100 through the internet. Further, the internet web server 100 transmits the attribute setting data received from the client to the target print servers (102 and 115) if necessary. Furthermore, in the step S510, the internet web server 100 or the print servers 102 and 115 store the attribute setting data generated by the clients 110 and 113 in the memory section (RAM 306 or the hard disk device 303).

Figure 6:
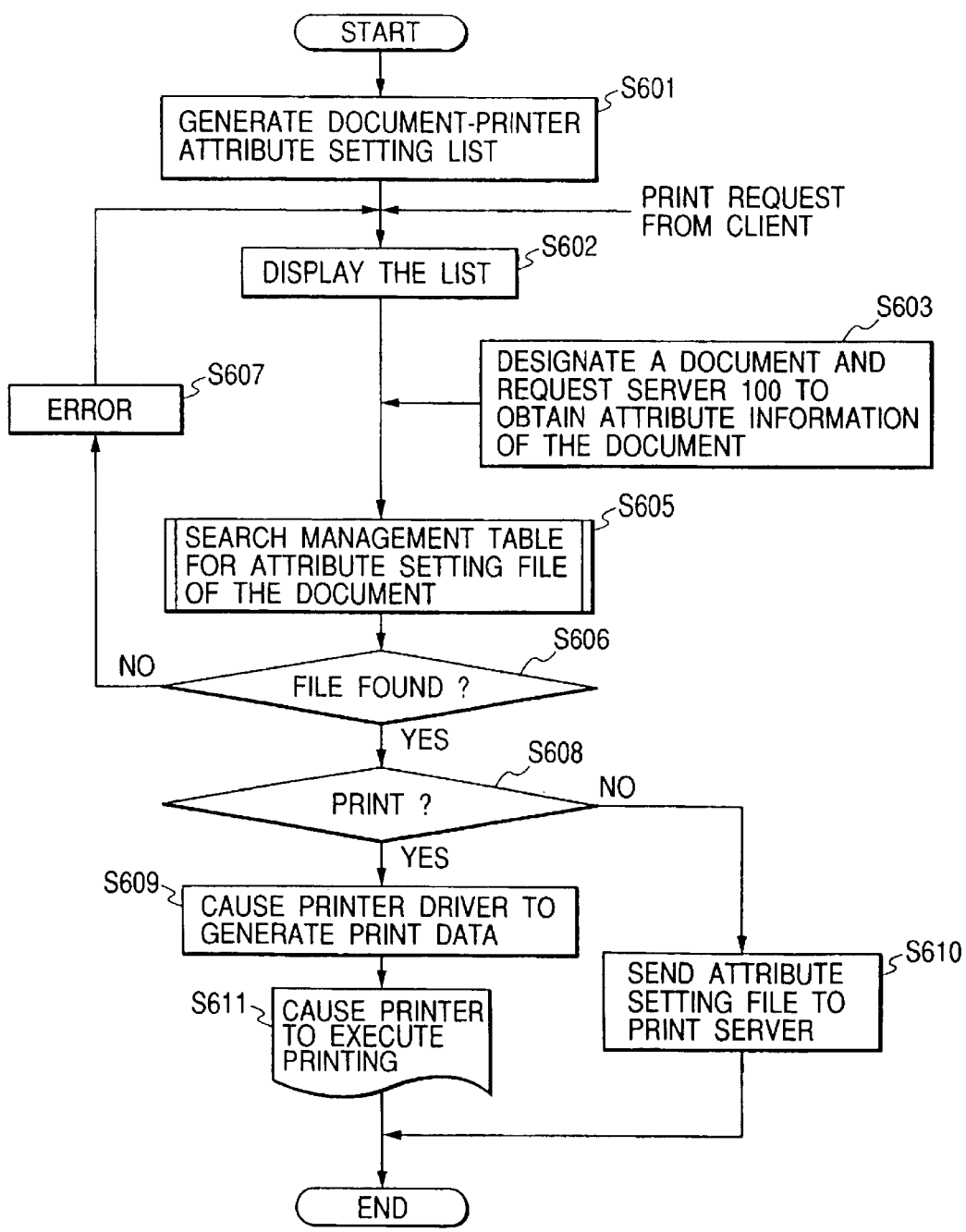
FIG. 6 is a flowchart showing the processing relating to a command issued from a client to a print server and "a document/printer (device) attribute setting list" generated by an internet web server 100.

FIG. 6 is a flowchart showing the command from the client to the print server and the processing relating to "the document-printer (device) attribute setting list" generated by the internet web server 100.

In the step S601, the internet web server 100 first generates a list (database) for associating a document to be printed with a printer for printing this document and the attribute with respect to this printer. That is, the internet web server 100 receives the attribute setting data generated by the client based on the information obtained in the steps S505 and S506 and analyzes the attribute setting data to create "the document-printer (device) attribute setting list" based on the document-dependent setting data, the device-dependent setting data, the version information, the document information and the printer identification data. The associated attribute information can be created as one file with respect to one item. The created list is stored and managed on the internet web server 100 or the print server.

When a connection request is issued from the client to the internet web server 100 and printing is requested from the client to the internet web server 100, the processing advances to the step S602. In the step S602, the internet web server 100 gives a description of "the document-device attribute setting list" in the HTML format to be transmitted to the client in response to the print request from the browser of the client to the internet web server. The client requesting printing uses the browser to open the HTML file received from the internet web server 100 so that a content such as shown in FIG. 9 is shown on the display.

Figure 9:
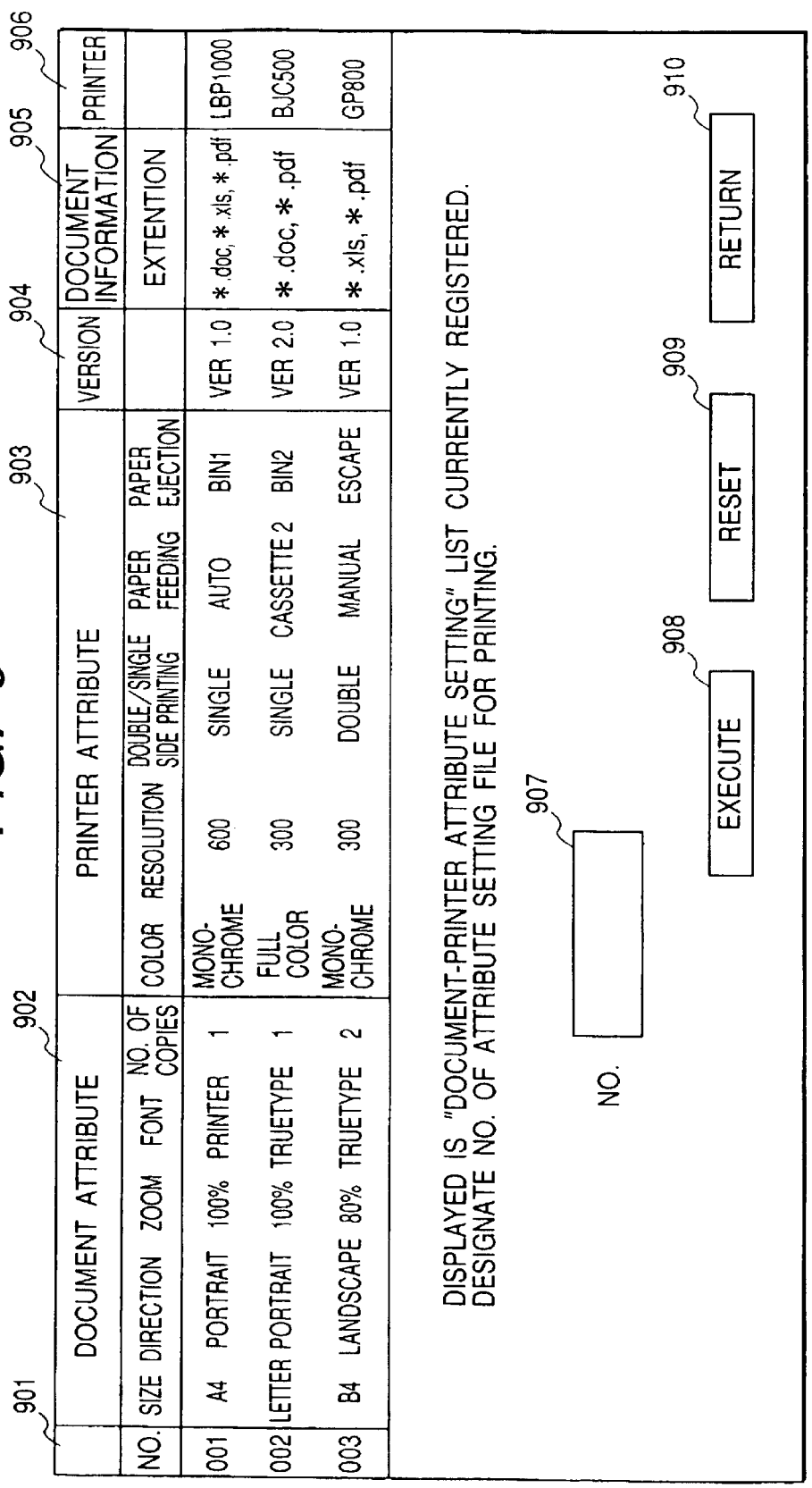
FIG. 9 is a user interface view of "a document/device attribute setting list" displayed by a browser of a client.

FIG. 9 is a list of "the document-device attribute settings." Reference numeral 901 denotes an identification number of the document-device attribute setting file managed on the internet web server 100. This identification number is given by the internet web server 100. Reference numeral 902 designates a document attribute generated by the client that has registered the attribute setting file to the internet web server 100 and 903 represents a printer attribute generated by that client and the detail thereof. Reference numeral 904 expresses version information of this system added in the step S504 in FIG. 5. Reference numeral 905 represents document information added in the step S505 in FIG. 5 and an extension of the document which can use this attribute setting file is shown. Reference numeral 906 denotes printer identification data added in the step S506 in FIG. 5, and a printer name which can use the printer attribute of this attribute setting file is shown. Reference numeral 907 designates a blank to which an identification number of the attribute setting file to be used is inputted. Reference numeral 908 designates an "execution" button and, when this button is clicked by an input device such as a mouse, the information filled in the blank is transmitted together with the acquisition request to the internet web server 100, and the internet web server 100 acquires the attribute setting file as will be described later so that the attribute setting file is transmitted to the internet web server itself or the print server used for printing. Reference numeral 909 represents a "reset" button and, when this button is clicked by an input device such as a mouse, the information entered in the blank 908 is reset to a null value so that nothing is inputted. Reference numeral 910 denotes a "return" button and, when this button is clicked by an input device such as a mouse, the screen of the browser returns to the previous page.

In the step S603, the client specifies a document to be printed and requests acquisition of the attribute information about this document with respect to the internet web server 100. The document is specified in a screen preceding the display of the browser in FIG. 9. Since this is a frequently used technique, the detail relating to the processing for specifying the file is omitted. The information of the specified document and the identification information of the attributed setting file specified from the browser are transmitted from the client to the internet web server 100. It is to be noted that the document which is a target of printing is intermediate data drawn by a drawing section of the OS and the intermediate file in this intermediate data format is transmitted to the internet web server 100. As the intermediate data, an EMF file in the Windows OS (registered trade mark of Microsoft in US) is used.

In the step S605, the internet web server 100 retrieves the attribute setting file of the corresponding document from a management table based on the attribute acquisition command in the step S603. The internet web server 100 has access to the management table to detect a destination of the link in which the desired attribute setting file is managed and stored. As described above, the attribute setting file is stored in the internet web server 100 or the print server (102, 115) and the management table manages the position at which each attribute setting file is stored.

If it is determined that there is no corresponding attribute setting file as a result of retrieval in the step S605, the internet web server 100 informs the client of an error in the step S607 and the client performs the error display on the browser to repeat the processing from the step S602 to the step S605.

If it is determined that there is the corresponding attribute setting file as a result of retrieval in the step S605, the internet web server 100 informs the client of existence of the attribute setting file and transmits the HTML file in order to inquire the client about execution of printing in the step S608. The client opens the received HTML file on the browser and urges a user to select whether printing is executed by using the radio button and the like. When the user specifies execution or non-execution of printing, the client transmits this direction to the internet web server 100. Upon receiving the direction from the client, the internet web server 100 makes a judgement upon whether this direction implies execution of printing.

In the step S608, when it is determined that printing is executed, the processing advances to the step S609. In the step S609, the internet web server 100 reads from the memory the printer driver corresponding to the printer (906 in FIG. 9) designated in the attribute setting file specified by the client to be activated and causes the printer driver to read the attribute setting file for performing the print setting of the driver so that the document information received from the client is converted into the print data by the printer driver in the step S603. Subsequently, in the step S611, the print data is transmitted to the target printer to execute the print output. When the printer to perform printing is not managed by the internet web server 100, the document information which is the file to be printed and the attribute setting file which is the print setting of the printer driver are transmitted to the print server which manages the printer specified in the attribute setting file indicated by the client. The print server uses the printer driver to generate the print data based on the file to be printed and the attribute setting file received from the internet web server 100 and transmits it to the printer for executing the print processing.

On the other hand, in the step S608, if it is determined that printing is not carried out, the attribute setting file is distributed together with the file to be printed to the memory of the print server which manages the printer indicated in the attribute setting file specified by the client in order to prepare for the subsequent processing.

Figure 7:
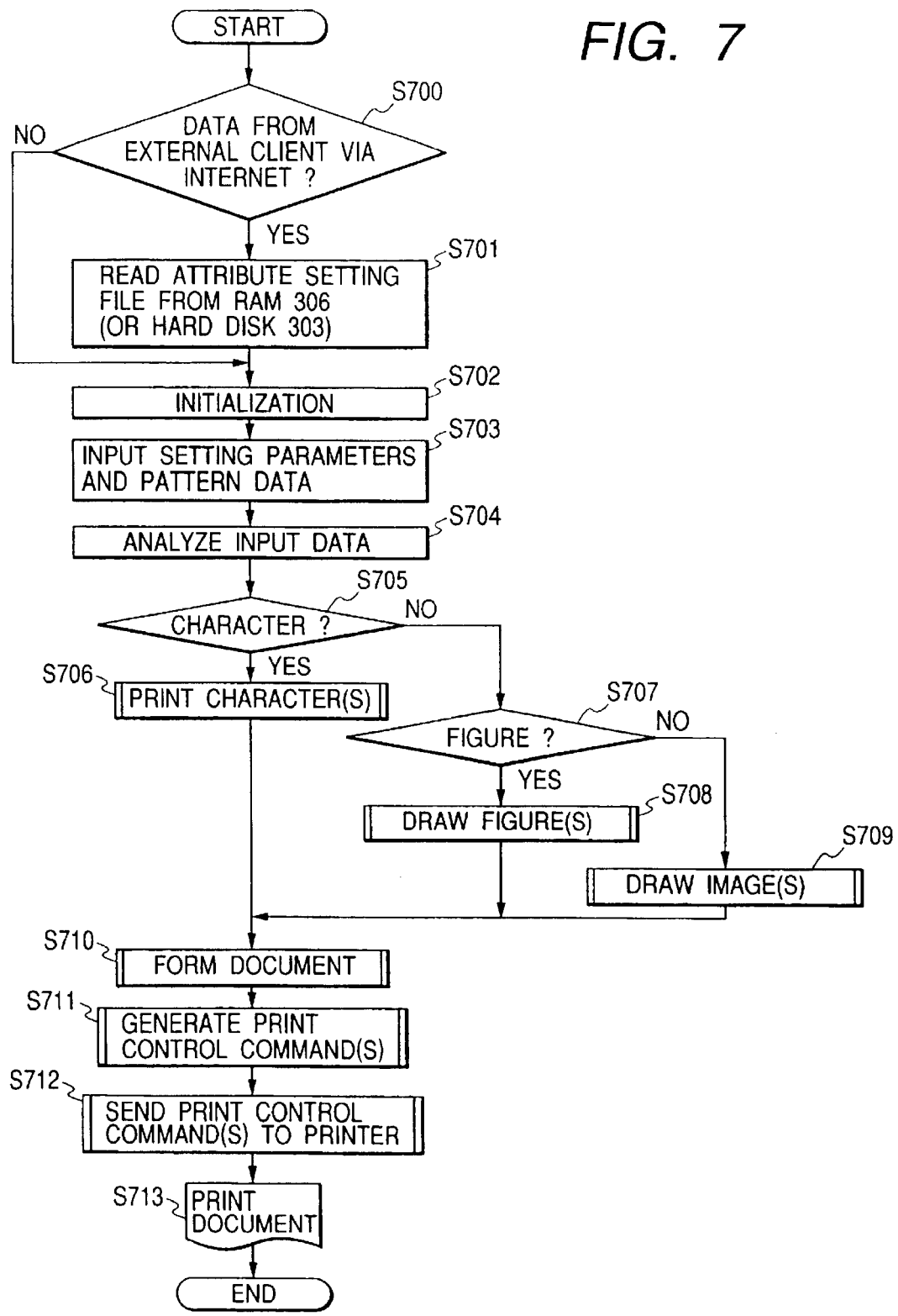
FIG. 7 is a flowchart showing a printer control program (printer driver) stored in a RAM 306 of a print server 300 (this function is provided to servers 102 and 115 and a client PC 110)

FIG. 7 is a flowchart showing a printer control program (printer driver) stored on the RAM 306 of the server 300 (the internet web server 100, the servers 102 and 115).

At first, in the step S700, the server 300 makes a judgement upon whether the print information received from the client is received from an external client through the internet or received from a client under control through the local area network. If it is determined that the received print information is received from the client under control, the processing (the printer control program) of the steps S702 to S713 is carried out without changing this print information namely, without changing the given attribute for printing). This printer control program (printer driver) is activated by a print command issued from outside to the printer to execute the processing of the steps S701 to S713.

On the other hand, in the step S700, if it is determined that the received print information is received from an external client, the control advances to the step S701.

In the step S701, the server 300 reads the attribute setting file from the memory (RAM) 306 or the hard disk device 303. That is, the processing corresponding to the step S609 in FIG. 6 is executed.

In the step S702, the initialization processing for each setting parameter with respect to the printer driver is carried out in order to carry out preparation for printing, e.g., setting of a paper size, a printing direction, a drawing resolution, a unit of a coordinate system and others.

In the step S703, each setting parameter for setting a pattern drawing output mode with respect to the printer driver is set. In case of a print request received via the internet, each parameter is set based on the attribute setting file.

Further, at this time, the print information (the document data) which is the file to be printed is inputted. This is generally inputted from the application program for creating a document through the operating system. Here, in case of the print target file transmitted from the client through the internet as described above, since such a file is an EMF file (the intermediate file), the data received from the client can be used as it is. Therefore, the print processing can be executed even if the print server does not have the application of the document file generated by the client which has made the print request via the internet.

In the step S704, the server 300 analyzes each setting parameter inputted as described above, the pattern data and others.

The parameters and data subjected to the analysis processing in the step S704 are further subjected to the steps S705 and 707 where they are separated into character data, figure data and image data.

The character data, the figure data and the image data separated in the steps S705 and S707 are subjected to the character print control processing, the figure drawing control processing and the image drawing control processing in the steps S706, S708 and S709, respectively.

In the step S710, the server 300 executes the document form control processing based on the character print control processing, the figure drawing control processing and the image drawing control processing in the steps S706, S708 and S709 and determines the output mode of patterns such as the drawing output attribute, the size calculation, the drawing output position and others to be arranged on an output page of the printer.

In this printer driver, the control data for outputting the document formed in the step S710 is converted/generated into a print control command for the printer by the print control command conversion processing (the module) in the step S711 in order to output the document to the printer.

At last, the print control command generated in the step S711 is transmitted to the printer 312 (see FIG. 3) by the processing for transmitting an output to the printer in the step S712 to print the document (step S713).

As described above, in the system according to this embodiment, the attribute setting file created by a given first client can be managed by the internet web server 100 to be utilized by a plurality of clients.

Further, when the internet web server manages the attribute setting of the printer driver controlling the printer managed by each print server, the client which can have access to the internet web server can perform print output with respect to the printer in a different subnet, a different LAN and a different network without the client having a driver for the printer.

In the above-described embodiment, although the attribute setting file generated by the client is held in the internet web server 100 or another print server via the internet web server 100, it can be consider that the intermediate file in the form of the intermediate data which is the print form file is held as well as the attribute setting file. In such a system, since the client which can have access to the internet web server 100 can execute the print output of the print target file by the print setting based on the attribute setting file indicated by the client by making direction on the browser, a plurality of clients can share the print target file, and the print output of the shared file can be executed on a target output destination desired by each client.

Incidentally, the attribute setting file may be always held by the internet web server 100, and reference to "the document-printer (device) attribute setting list" (step S601: FIG. 6) may be made based on the document information (step S505 in FIG. 5) added to the attribute setting data by the document print command from the client so that the internet web server 100 can automatically distribute the attribute setting data file to the print server managing the printer which should make the print output. By doing so, the burden imposed on each print server can be lightened.

[Second Embodiment]

In the first embodiment described above, when the attribute setting file generated by a given client is registered to the internet web server and this attribute setting file is shared by a plurality of clients, the client can transmit the print target file to the server, and the print processing can be executed by only designating the attribute setting file.

In a second embodiment, description will be given as to such a scheme as that the attribute setting file is intensively managed by the internet web server 100 and the attribute setting file is distributed to each client.

In regard to the processing, when the client requests acquisition of the attribute setting file to the internet web server 100 in the step S603 in FIG. 6, the internet web server 100 causes the client to download the designated attributed setting.

The print attribute parameters of the file to be printed are set the printer driver based on the attribute setting file acquired by each client, and this printer driver is used to generate the print control data which is the print information, thereby directing printing to the printer. The detail will now be described hereinafter.

When the client downloads the attribute setting file from the internet web server, the print attribute setting of the corresponding printer driver managed by the client is read, and the print attribute setting is rewritten on the content set in the downloaded attribute setting file and stored. Subsequently, when a user directs printing of the file to be printed, since the above-described setting is established in the printer driver, the user can generate the print control data having the setting equal to that of the attribute setting designated by the internet web server without changing the print setting. The application can communicate with the printer driver and output the drawing data (GDI function in the Windows OS) to the OS based on the setting of the driver, whilst the OS outputs the intermediate data (DDI function in the Windows OS) and the printer driver reads the determined print attribute setting (DEVMODE in the Windows OS) so that the print information in the page descriptive language format is generated and the print information is outputted to a destination port.

In this manner, the attribute setting file which is the print setting parameters of the printer driver generated/registered by a given client can be shared by a plurality of clients by control of the internet web server, and it is not necessary to execute print setting in each client when printing in a determined format such as a form, thereby advantageously improving the usability as a system.

It is to be noted that the generated attribute setting data may be translated into a file by the user interface on the printer driver instead of the setting screen (user interface: see FIG. 2) developed on the internet browser. The internet may be used to transmit such a file to a target print server.

Incidentally, in place of the Ethernet interface shown in FIG. 3 for connecting the print server 300 to the printer 312, an input/output parallel interface conforming to Centronics, an input/output serial interface conforming to RS-232C or RS-424 or a SCSI interface may be used.

It is needless to say that the invention according to the first and second embodiments can be attached by supplying a storage medium storing therein a program code of software realizing the functions of each embodiment described above to the system or the apparatus and reading and executing the program code stored in the storage medium by a computer (or CPU or MPU) of that system or apparatus.

In such a case, the program code itself read from the storage medium can realize the novel function of the present invention and the storage medium storing therein the program code can constitute the present invention.

As a storage medium for supplying the program code, it is possible to use, for example, a floppy disk, a hard disk, a magneto-optical disk, an optical disk, a CD-ROM, a CD-R, a magnetic tape, a non-volatile memory card, a ROM and others.

Execution of the program code read by the computer can realize the function of the embodiments described above, and the function of the embodiments can be also realized by executing a part of or all of the actual processing by the OS and the like activated on the computer based on a direction of the program code.

In addition, when the program code read from the storage medium is written on the memory provided to a function extender board inserted into the computer or a function extender unit connected to the computer and the CPU and the like provided to the function extender board or the function extender unit thereafter executes a part of or all of the actual processing based on a direction of the program code, the function of the above-described embodiments can be realized.

In order to realize the function processing according to the present invention by a computer, the program code itself installed in the computer can also realize the present invention. That is, claims of the present invention include the computer program itself for realizing the function processing according to the present invention. Supply of the computer program is not restricted to a method that the computer program is stored in an FD or a CD-ROM as described above and read by the computer to be installed in the computer, and the supply can be also attained by connecting to an internet web page by using the browser of the client computer and downloading the computer program itself or a compressed file having an automatic installing function from this web page. Further, the supply of the computer program can be also realized by dividing the program code constituting the program according to the present invention into a plurality of files and downloading the respective files from different web pages. That is, a WWW server for enabling a plurality of users to download the program file for realizing the function processing of the present invention by the computer can be also included in the claims of the present invention.

Additionally, the program according to the present invention may be encoded and stored in a storage medium such as an FD to be distributed to users; a user who satisfies predetermined conditions may be allowed to download key information for decoding from a web page via the internet; and the encoded program may be executed by using the key information to be installed in the computer, thereby realizing the present invention.

As described above, according to the embodiments, it is possible to provide a system which is efficient and inexpensive in terms of the document output. For example, in the internet environment, the attribute setting data of a printer on the internet which has been selected and designated as a target printer is distributed from a host system as a print server to a client issuing a document print command, and a document based on this print attribute setting data is created, thereby obtaining the following advantages.

(1) In the internet environment, since a public line or a dedicated line with a low charge which is one of characteristics of the internet can be used by performing the document output based on the attribute setting data distributed from the server, it is possible to provide a print system with the lower cost than that of a dedicated line for the network connecting remote sites and facilities for managing such a line.

(2) In the internet environment, creation, transmission and reception of the attribute setting data by the internet browser are possible and a target document can be outputted to a target printer based on an optimum attribute setting with a simple operation, thereby improving the efficiency of the printing job.

As described above, according to the present invention, there can be provided a print server and a print processing method for enabling printing of a document based on the attribute setting information managed by the web server when a plurality of clients output the same or similar document to a desired printer which is not controlled by the server which is equal to that of the clients in the internet environment.

Further, it is possible to provide a print processing method for enabling the print output even if the client does not have a printer driver for controlling a printer in case of directing printing to the corresponding printer via the internet.

Furthermore, it is possible to provide a print processing method by which a plurality of users can share the print output of a print target file generated by an arbitrary client without each client having the application used for creating the print target file.

As many apparently widely different embodiments of the present invention can be made without departing from the spirit and scope thereof, it is to be understood that the invention is not limited to the specific embodiments thereof except as defined in the appended claims.

What is claimed is:

1. A print attribute management server for receiving print information and an instruction specifying print attribute information from a plurality of clients and executing print processing of the received print information at a printer designated from a plurality of printers, said server comprising:

managing means for managing a plurality of units of print attribute information used in executing the print processing by the designated printer, the plurality of units of print attribute information being input independent of the print information;

communicating means for receiving the print information and the instruction specifying print attribute information from the plurality of units of print attribute information managed by said managing means from one of the plurality of clients;

specifying means for specifying the print attribute information from among the plurality of units of print attribute information on the basis of the instruction received by said communication means; and controlling means for converting the print information received by said communicating means into print data which can be printed by the designated printer, using the print attribute information specified by said specifying means.

2. A print attribute management server according to claim 1, wherein the plurality of units of print attribute information includes an attribute relating to print paper.

3. A print attribute management server according to claim 1, wherein the plurality of units of print attribute information includes an attribute relating to an output characteristic of a printer.

4. A print attribute management server according to claim 1, further comprising judging means for judging whether the received print information is received from an external client through the internet or received from a client under control via a local area network, wherein when said judging means judges that the received print information is received from a client under control via the local area network, said controlling means transmits the received print information to the designated printer without modifying the print information.

5. A print attribute management server according to claim 1, wherein print attribute information generated by a client under control via the local area network and/or an external client is received to be held and translated into a file in accordance with each printer.

6. A print attribute management server according to claim 1, wherein the print information received via the internet is a file which is generated by an operating system (OS) and takes a form of intermediate data.

7. A print processing method using a print attribute management server for receiving print information and an instruction specifying print attribute information from a plurality of clients and executing print processing of the received print information at a printer designated from a plurality of printers, said method comprising the steps of:
　　managing a plurality of units of print attribute information used in executing the print processing by the designated printer, the plurality of units of print attribute information being input independent of the print information;
　　receiving the print information and the instruction specifying print attribute information from the plurality of units of print attribute information managed in said managing step from one of the plurality of clients;
　　specifying the print attribute information from among the plurality of units of print attribute information on the basis of the instruction received in said receiving step; and
　　converting the print information received in said receiving step into print data which can be printed by the designated printer, using the print attribute information specified in said specifying step.

8. A print processing method according to claim 7, wherein the plurality of units of print attribute information includes an attribute relating to print paper.

9. A print processing method according to claim 7, wherein the plurality of units of print attribute information includes an attribute relating to an output characteristic of said printer.

10. A print processing method according to claim 7, further comprising the step of judging whether the received print information is received from an external client via the internet or received from a client under control via a local area network, wherein when it is judged in said judgment step that the received print information is received from a client under control via the local area network, the received print information is controlled to be transmitted to the designated printer without modifying the print information in said control step.

11. A print processing method according to claim 7, wherein attribute information generated by a client under control via the local area network and/or an external client is received to be held and translated into a file in accordance with each printer.

12. A print processing method according to claim 7, wherein the print information received via the internet is a file in the form of intermediate data generated by an operating system (OS).

13. A computer-readable storage medium for storing a print processing program using a print attribute management server for receiving print information and an instruction specifying print attribute information from a plurality of clients and executing print processing of the received print information at a printer designated from a plurality of printers, said print processing program comprising code for:
　　managing in a memory a plurality of units of print attribute information used in executing the print processing by the designated printer, the plurality of units of print attribute information being input independent of the print information;
　　receiving the print information and the instruction specifying print attribute information from the plurality of units of print attribute information managed in said managing step from one of the plurality of clients;
　　specifying the print attribute information from among the plurality of units of print attribute information on the basis of the instruction received in said receiving step; and
　　converting the print information received in said receiving step into print data which can be printed by the designated printer, using the print attribute information specified in said specifying step.

14. A storage medium according to claim 13, wherein the plurality of units of print attribute information includes an attribute relating to print paper.

15. A storage medium according to claim 13, wherein the plurality of units of print attribute information includes an attribute relating to an output characteristic of a printer.

16. A storage medium according to claim 13, wherein said print processing program further comprises code for judging whether the received print information is received from an external client via the internet or received from a client under control via a local area network, wherein when it is judged in said judging step that the received print information is received from a client under control via the local area network, said controlling step includes transmitting the received print information to the designated printer without modifying the print information.

17. A storage medium according to claim 13, wherein, attribute information generated by a client under control via the local area network and/or an external client is received to be held and translated into a file in accordance with each printer.

18. A storage medium according to claim 13, wherein the print information received via the internet is a file in the form of intermediate data generated by an operating system (OS).

19. A print processing program used by a print attribute management server for receiving print information and an instruction specifying print attribute information from a plurality of clients and executing print processing of the received print information at a printer designated from a plurality of printers, said print processing program comprising code for:
　　managing in a memory a plurality of units of print attribute information used in executing the print processing by the designated printer, the plurality of units of print attribute information being input independent of the print information;
　　receiving the print information and the instruction specifying print attribute information from the plurality of units of print attribute information managed in said managing step from one of the plurality of clients;
　　specifying the print attribute information from among the plurality of units of print attribute information on the basis of the instruction received in said receiving step; and converting the print information received in said receiving step into print data which can be printed by the designated printer, using the print attribute information specified in said specifying step.

20. A print processing program according to claim 19, wherein the plurality of units of print attribute information includes an attribute relating to print paper.

21. A print processing program according to claim 19, wherein the plurality of units of print attribute information includes an attribute relating to an output characteristic of a printer.

22. A print processing program according to claim 19, further comprising code for judging whether the received print information is received from an external client via the internet or received from a client under control via a local area network, wherein when it is judged in said judging step that the received print information is received from a client under control via the local area network, said controlling step includes transmitting the received print information to the designated printer without modifying the print information.

23. A print processing program according to claim 19, wherein attribute information generated by a client under control via the local area network and/or an external client is received to be held and translated into a file in accordance with each printer.

24. A print processing program according to claim 19, wherein print information received via the internet is a file in the form of intermediate data generated by an operating system (OS).

25. A print server for receiving print information from a plurality of clients via the Internet and enabling a designated printer to execute print processing of the received print information, said server comprising:

managing means for managing print attribute information received from a first client and used for executing the print processing by the designated printer, wherein the print attribute information is provided independent of the received print information and can be set to a print setting of printer drivers of the plurality of clients;

distributing means for distributing the print attribute information to a second client in response to a request for acquiring the print attribute information received from the second client; and outputting means for receiving print information generated by a printer driver of the second client based on the distributed print attribute information and outputting the received print information to the designated printer, wherein the print set of the printer driver of the second client is updated by the distributed print attribute information.

26. A control method performed in a print server for receiving print information from a plurality of clients via the Internet and enabling a designated printer to execute print processing of the received print information, said method comprising the steps of:

managing print attribute information received from a first client and used for executing the print processing by the designated printer, wherein the print attribute information is provided independent of the received print information and can be set to a print setting of printer drivers of the plurality of clients;

distributing the print attribute information to a second client in response to a request for acquiring the print attribute information received from the second client; and receiving print information generated by a printer driver of the second client based on the distributed print attribute information and outputting the print information to the designated printer, wherein the print setting of the printer driver of the second client is updated by the distributed print attribute information.

27. A computer-readable memory medium storing a computer program executing a control method in a print server for receiving print information from a plurality of clients via the Internet and enabling a designated printer to execute print processing of the received print information, said computer program comprising code for:

managing print attribute information received from a first client and used for executing the print processing by the designated printer, wherein the print attribute information is provided independent of the received print information and can be set to a print setting of printer drivers of the plurality of clients;

distributing the print attribute information to a second client in response to a request for acquiring the print attribute information received from the second client; and receiving print information generated by a printer driver of the second client based on the distributed print attribute information and outputting the received print information to the designated printer, wherein the print setting of the printer driver for the second client is updated by the distributed print attribute information.

28. A print control program executing a control method performed in a print server for receiving print information from a plurality of clients via the Internet and enabling a designated printer to execute print processing of the received print information, said print control program comprising code for:

managing print attribute information received from a first client and used for executing the print processing by the designated printer, wherein the print attribute information is provided independent of the received print information and can be set to a print setting of printer drivers of the plurality of clients;

distributing the print attribute information to a second client in response to a request for acquiring the print attribute information received from the second client; and receiving print information generated by a printer driver of the second client based on the distributed print attribute information and outputting the received print information to the designated printer, wherein the print setting of the printer driver of the second client is updated by the distributed print attribute information.

29. An information processing apparatus operating as a client for communicating via the Internet with a server that manages print attribute information and for executing print processing by a printer, said apparatus comprising:

issuing means for issuing a request for acquiring print attribute information to the server, the print attribute information being managed independent of print information at the server;

print attribute setting means for acquiring the print attribute information in response to the issued acquisition request and performing print setting of a printer driver as a print attribute of print information on the basis of the acquired print attribute information; and print data converting means for converting the print information into print data which can be printed by the printer based on the set print attribute by using the printer driver set by said print attribute setting means.

30. An information processing apparatus according to claim 29, further comprising:

inputting means for inputting print attribute information constituted by document-dependent setting information and device-dependent setting information; and transmitting means for transmitting the inputted print attribute information to the server to be registered.

31. A method for controlling an information processing apparatus operating as a client for communicating via the Internet with a server that manages print attribute information and for executing print processing by a printer, said method comprising the steps of:

issuing a request acquiring print attribute information to the server, the print attribute information being managed independent of the print information at the server;

acquiring the print attribute information in response to the issued acquisition request and performing print setting of a printer driver as a print attribute of print information on the basis of the acquired print attribute information; and converting the print information into print data which can be printed by the printer based on the set print attribute by using the printer driver set in said print attribute setting step.

32. A method according to claim 31, further comprising:

inputting print attribute information constituted by document-dependent setting information and device-dependent setting information; and transmitting the inputted print attribute information to the server to be registered.

33. A computer-readable storage medium storing an information processing program used by a client for communicating via the Internet with a server that manages print attribute information and for executing print processing by a printer, said information processing program comprising code for:

issuing a request for acquiring print attribute information to server, the print attribute information being managed independent of print information at the server;

acquiring the print attribute information in response to the issued acquisition request and performing print setting of a printer driver as a print attribute of print information on the basis of the acquired print attribute information; and converting the print information into print data which can be printed by the printer based on the set print attribute by using the printer driver set in said print attribute setting step.

34. A storage medium according to claim 33, wherein said information processing program further includes code for:

inputting print attribute information constituted by document-dependent setting information and device-dependent setting information; and transmitting the inputted print attribute information to the server to be registered.

* * * * *

UNITED STATES PATENT AND TRADEMARK OFFICE
CERTIFICATE OF CORRECTION

| | |
|---|---|
| PATENT NO. | : 7,075,670 B1 |
| APPLICATION NO. | : 09/498628 |
| DATED | : July 11, 2006 |
| INVENTOR(S) | : Hiroshi Koga |

It is certified that error appears in the above-identified patent and that said Letters Patent is hereby corrected as shown below:

COVER PAGE:
Item (54) and Col. 1, line 1, Title, "SERVER APPARATUS FOR MANAGING PRINT ATTRIBUTE INFORMATION AND PRINT CONTROLLING" should read
-- SERVER APPARATUS FOR MANAGING PRINT ATTRIBUTE INFORMATION AND PRINT CONTROLLING METHOD --.

COLUMN 2:
Line 26, "he" should read -- the --.

COLUMN 4:
Line 2, "be also" should read -- also be --.

COLUMN 5:
Line 16, "Internet" should read -- internet --; and
Line 21, "request" should read -- requests --.

COLUMN 6:
Line 66, "enables" should read -- enable --.

COLUMN 8:
Line 23, "clients" should read -- client --.

COLUMN 10:
Line 46, "namely," should read -- (namely, --.

COLUMN 11:
Line 55, "consider" should read -- considered --; and
Line 65, "be always" should read -- always be --.

COLUMN 12:
Line 25, "set" should read -- set to --.

COLUMN 13:
Lines 16, 38, 43 and 49, "be also" should read -- also be --.

COLUMN 14:
Line 2, "of" should read -- of the --; and
Line 3, "can" should read -- that can --.

UNITED STATES PATENT AND TRADEMARK OFFICE
CERTIFICATE OF CORRECTION

PATENT NO. : 7,075,670 B1
APPLICATION NO. : 09/498628
DATED : July 11, 2006
INVENTOR(S) : Hiroshi Koga It is certified that error appears in the above-identified patent and that said Letters Patent is hereby corrected as shown below:

COLUMN 18:
Line 31, "print control program" should read -- computer-readable storage medium --.

COLUMN 20:
Line 11, "server," should read -- the server, --.

Signed and Sealed this

Fifteenth Day of December, 2009

David J. Kappos
*Director of the United States Patent and Trademark Office*